United States Patent
Taylor et al.

(10) Patent No.: US 9,760,081 B2
(45) Date of Patent: Sep. 12, 2017

(54) SYSTEM AND METHOD FOR OPTIMIZING A WORK IMPLEMENT PATH

(71) Applicant: Caterpillar Inc., Peoria, IL (US)

(72) Inventors: Michael Taylor, Swissvale, PA (US); Mo Wei, Dunlap, IL (US); Thandava K. Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 544 days.

(21) Appl. No.: 14/484,601

(22) Filed: Sep. 12, 2014

(65) Prior Publication Data

US 2016/0077514 A1    Mar. 17, 2016

(51) Int. Cl.
| | |
|---|---|
| *G05B 19/402* | (2006.01) |
| *G05D 1/02* | (2006.01) |
| *E01C 19/00* | (2006.01) |
| *E02F 3/84* | (2006.01) |
| *E02F 9/20* | (2006.01) |
| *E02F 9/26* | (2006.01) |

(52) U.S. Cl.
CPC .......... *G05B 19/402* (2013.01); *E01C 19/004* (2013.01); *E02F 3/841* (2013.01); *E02F 9/205* (2013.01); *E02F 9/2045* (2013.01); *E02F 9/262* (2013.01); *G05D 1/0217* (2013.01); *G05D 1/0278* (2013.01); *G05B 2219/49372* (2013.01); *G05D 2201/0202* (2013.01)

(58) Field of Classification Search
CPC ........ G05B 19/402; G05B 2219/49372; G05D 1/0278; G05D 1/0217; G05D 2201/0202; E01C 19/004; E02F 3/841; E02F 9/2045; E02F 9/205; E02F 9/262
See application file for complete search history.

(56) References Cited

U.S. PATENT DOCUMENTS

| | | | |
|---|---|---|---|
| 5,551,524 | A | 9/1996 | Yamamoto et al. |
| 5,864,970 | A | 2/1999 | Maddock et al. |
| 6,167,336 | A | 12/2000 | Singh et al. |
| 6,445,310 | B1 | 9/2002 | Bateman et al. |
| 6,845,311 | B1 | 1/2005 | Stratton et al. |
| 7,216,033 | B2 | 5/2007 | Flann et al. |
| 7,578,079 | B2 | 8/2009 | Furem |
| 7,734,398 | B2 | 6/2010 | Manneppalli |
| 7,979,175 | B2 | 7/2011 | Allard et al. |
| 8,073,584 | B2 | 12/2011 | Marty et al. |
| 8,139,108 | B2 | 3/2012 | Stratton et al. |
| 8,351,684 | B2 | 1/2013 | Clar et al. |
| 8,456,327 | B2 | 6/2013 | Bechtel et al. |
| 8,620,535 | B2 | 12/2013 | Friend et al. |
| 2007/0129869 | A1 | 6/2007 | Gudat et al. |
| 2008/0180523 | A1 | 7/2008 | Stratton et al. |

(Continued)

*Primary Examiner* — Anne M Antonucci
(74) *Attorney, Agent, or Firm* — Leydig, Voit & Mayer, Ltd.

(57) ABSTRACT

A system for determining an optimized cut location for a work implement includes a position sensor and a controller. The controller is configured to determine the position of a work surface and perform a coarse analysis along a path based upon the position of the work surface and a coarse analysis parameter threshold to select a selected coarse analysis increment. The controller is further configured to perform a fine analysis along the selected coarse analysis increment based upon the position of the work surface and a fine analysis parameter threshold to select the optimized cut location.

20 Claims, 7 Drawing Sheets

(56) References Cited

U.S. PATENT DOCUMENTS

| | | |
|---|---|---|
| 2009/0043462 A1 | 2/2009 | Stratton et al. |
| 2009/0202109 A1 | 8/2009 | Clar et al. |
| 2010/0250023 A1 | 9/2010 | Gudat |
| 2011/0093171 A1 | 4/2011 | Saposnik |
| 2012/0089293 A1 | 4/2012 | Halder et al. |
| 2012/0139325 A1 | 6/2012 | Norberg et al. |
| 2012/0154572 A1 | 6/2012 | Stratton et al. |
| 2012/0215378 A1 | 8/2012 | Sprock et al. |
| 2014/0012404 A1 | 1/2014 | Taylor et al. |
| 2014/0032030 A1 | 1/2014 | Stratton et al. |
| 2014/0032058 A1 | 1/2014 | Stratton et al. |
| 2014/0032132 A1 | 1/2014 | Stratton et al. |
| 2014/0180548 A1* | 6/2014 | Edara ............ G05B 13/024 701/50 |

* cited by examiner

SYSTEM AND METHOD FOR OPTIMIZING A WORK IMPLEMENT PATH

TECHNICAL FIELD

This disclosure relates generally to controlling a machine and, more particularly, to a system and method for planning a path of a work implement to optimize an operating parameter related to a material moving operation.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Movement of the machines and their associated work implements are often developed by a planning system or module. A plurality of variables may affect the planning system and impact the efficiency of the machine operation. It is often desirable to ensure that the machines perform the material movement operations such that the materials are moved in an efficient manner. For example, it may be desirable to ensure that the locations at which the machines begin to alter the work surface, and/or the profiles along which the machines alter the work surface, are chosen such that the machines function efficiently.

PCT Patent Publication No. 2008/0118027 discloses a method of contour shaping by a machine equipped with a cutting implement. The method includes providing a desired topographical plan, measuring the real time position of at least one of the machine and the cutting implement, generating instructions to move the cutting implement, plotting a transitional path from the real time position of the machine or the cutting implement to a point on the desired topographical plan, and using the transitional path and the real time position of the machine or the cutting implement to generate the instructions to move the cutting implement.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for determining an optimized cut location for a work implement of a machine includes a position sensor for generating position signals indicative of a position of a work surface, and a controller. The controller is configured to store a coarse analysis cut length, a coarse analysis parameter threshold, a fine analysis cut length, and a fine analysis parameter threshold. The controller is also configured to determine the position of the work surface based upon the position signals, determine a position of each of a plurality of coarse analysis increments along the path, determine a coarse analysis parameter for each of the plurality of coarse analysis increments based upon the position of the work surface and the coarse analysis cut length, and select one of the plurality of coarse analysis increments based upon the coarse analysis parameter threshold, the coarse analysis parameter for each of the plurality of coarse analysis increments, and the position of each of the plurality of coarse analysis increments relative to the path to define a selected coarse analysis increment. The controller is further configured to determine a position of each of a plurality of fine analysis increments along the selected coarse analysis increment, determine a fine analysis parameter for each of the plurality of fine analysis increments based upon the position of the work surface and the fine analysis cut length, and select the optimized cut location from one of the plurality of fine analysis increments based upon the fine analysis parameter threshold, the fine analysis parameter for each of the plurality of fine analysis increments, and the position of each of the plurality of fine analysis increments relative to the selected coarse analysis increment.

In another aspect, a controller-implemented method for determining an optimized cut location for a work implement of a machine includes storing a coarse analysis cut length, a coarse analysis parameter threshold, a fine analysis cut length, and a fine analysis parameter threshold. The method also includes determining a position of the work surface based upon position signals from a position sensor, determining a position of each of a plurality of coarse analysis increments along the path, determining a coarse analysis parameter for each of the plurality of coarse analysis increments based upon the position of the work surface and the coarse analysis cut length, and selecting one of the plurality of coarse analysis increments based upon the coarse analysis parameter threshold, the coarse analysis parameter for each of the plurality of coarse analysis increments, and the position of each of the plurality of coarse analysis increments relative to the path to define a selected coarse analysis increment. The method further includes determining a position of each of a plurality of fine analysis increments along the selected coarse analysis increment, determining a fine analysis parameter for each of the plurality of fine analysis increments based upon the position of the work surface and the fine analysis cut length, and selecting the optimized cut location from one of the plurality of fine analysis increments based upon the fine analysis parameter threshold, the fine analysis parameter for each of the plurality of fine analysis increments, and the position of each of the plurality of fine analysis increments relative to the selected coarse analysis increment.

In still another aspect a machine includes a prime mover, a work implement for engaging a work surface along a path, a position sensor for generating position signals indicative of a position of the work surface, and a controller. The controller is configured to store a coarse analysis cut length, a coarse analysis parameter threshold, a fine analysis cut length, and a fine analysis parameter threshold. The controller is also configured to determine the position of the work surface based upon the position signals, determine a position of each of a plurality of coarse analysis increments along the path, determine a coarse analysis parameter for each of the plurality of coarse analysis increments based upon the position of the work surface and the coarse analysis cut length, and select one of the plurality of coarse analysis increments based upon the coarse analysis parameter threshold, the coarse analysis parameter for each of the plurality of coarse analysis increments, and the position of each of the plurality of coarse analysis increments relative to the path to define a selected coarse analysis increment. The controller is further configured to determine a position of each of a plurality of fine analysis increments along the selected coarse analysis increment, determine a fine analysis parameter for each of the plurality of fine analysis increments based upon the position of the work surface and the fine analysis cut length, and select the optimized cut location from one of the plurality of fine analysis increments based upon the fine analysis parameter threshold, the fine analysis parameter for each of the plurality of fine analysis increments, and the position of each of the plurality of fine analysis increments relative to the selected coarse analysis increment.

DETAILED DESCRIPTION

Figure 1:
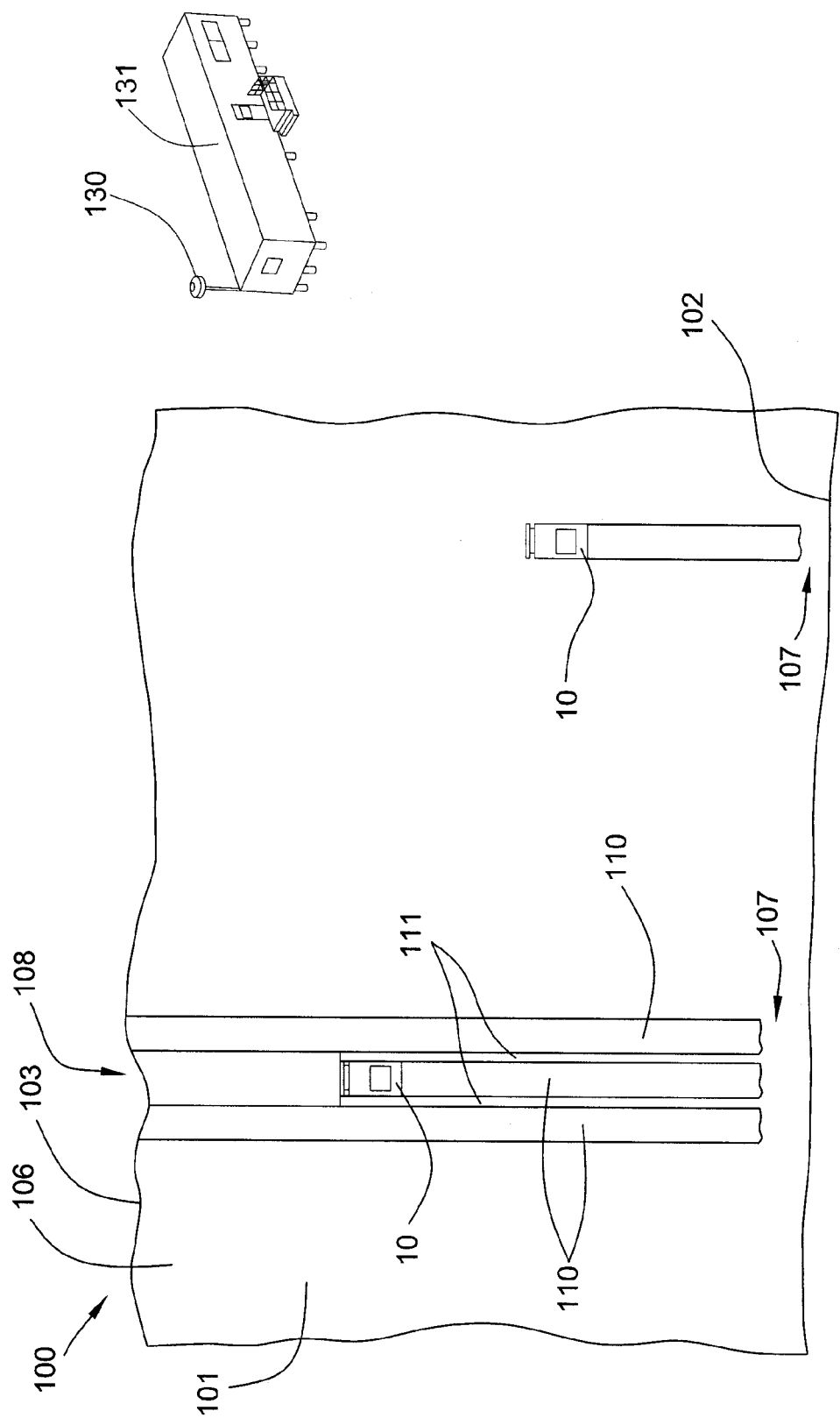
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
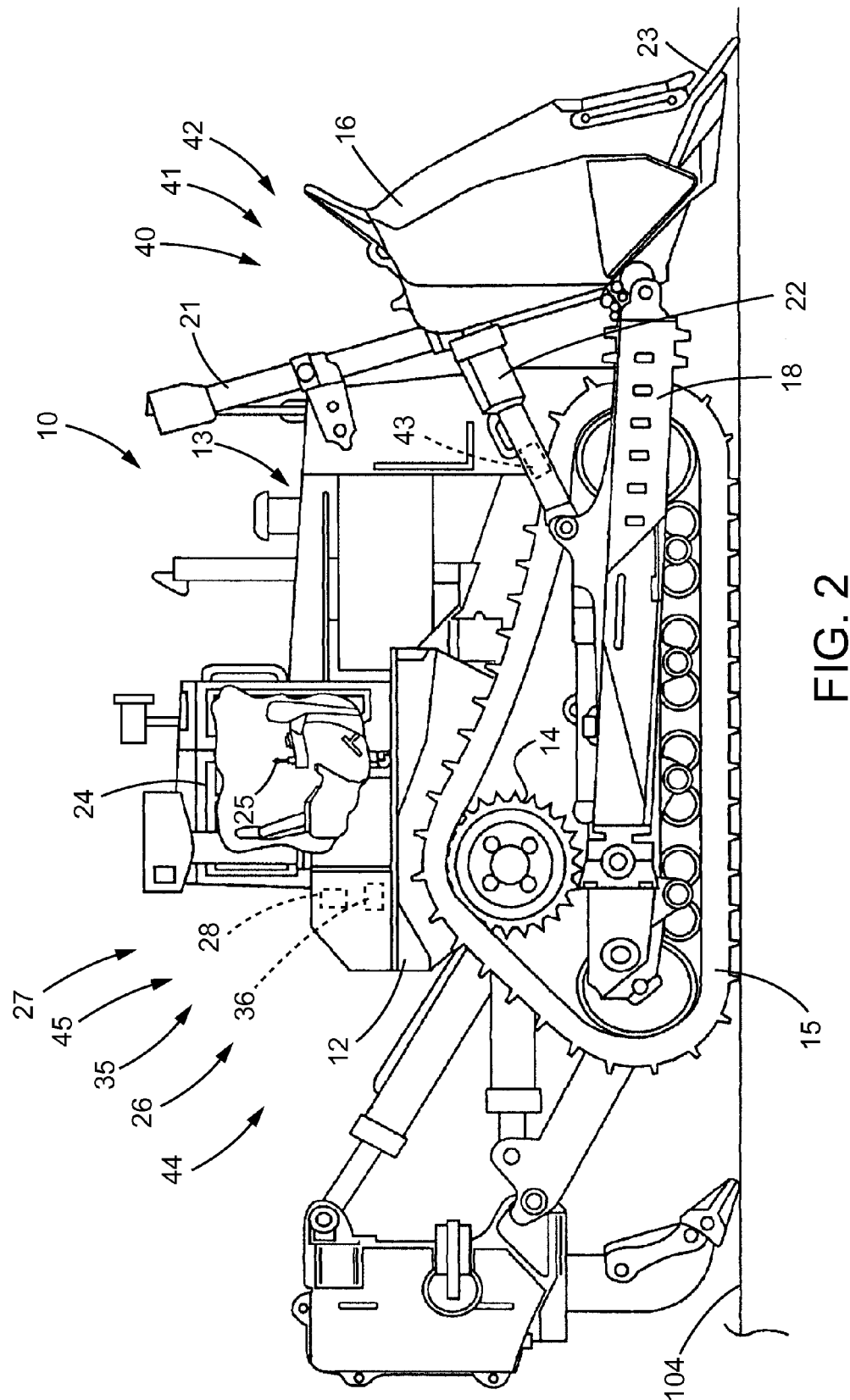
FIG. 2 depicts a diagrammatic illustration of a machine in accordance with the disclosure.

FIG. 2 depicts a diagrammatic illustration of a machine 10 such as a dozer with a ground-engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 130 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 131 (FIG. 1). The functionality of control system 35 may be distributed so that certain functions are performed at machine 10 and other functions are performed remotely. In such case, the control system 35 may include a communications system such as wireless communications system 130 for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

Machine 10 may be configured to move material at the work site 100 according to one or more material movement plans from an initial location 107 to a spread or dump location 108. The dump location 108 may be at crest 103 or at any other location. The material movement plans may include, among other things, forming a plurality of spaced apart channels or slots 110 that are cut into the work surface 104 at work site 100 along a path from the initial location 107 to the dump location 108. In doing so, each machine 10 may move back and forth along a linear path between the initial location 107 and the dump location 108. If desired, a relatively small amount of material may be left or built up as walls 111 between adjacent slots 110 to prevent or reduce spillage and increase the efficiency of the material moving process. The walls 111 between the slots 110 may be moved after the slots are formed or periodically as desired. The process of moving material through slots 110 while utilizing walls 111 of material to increase the efficiency of the process is sometime referred to as "slot dozing."

Figure 3:
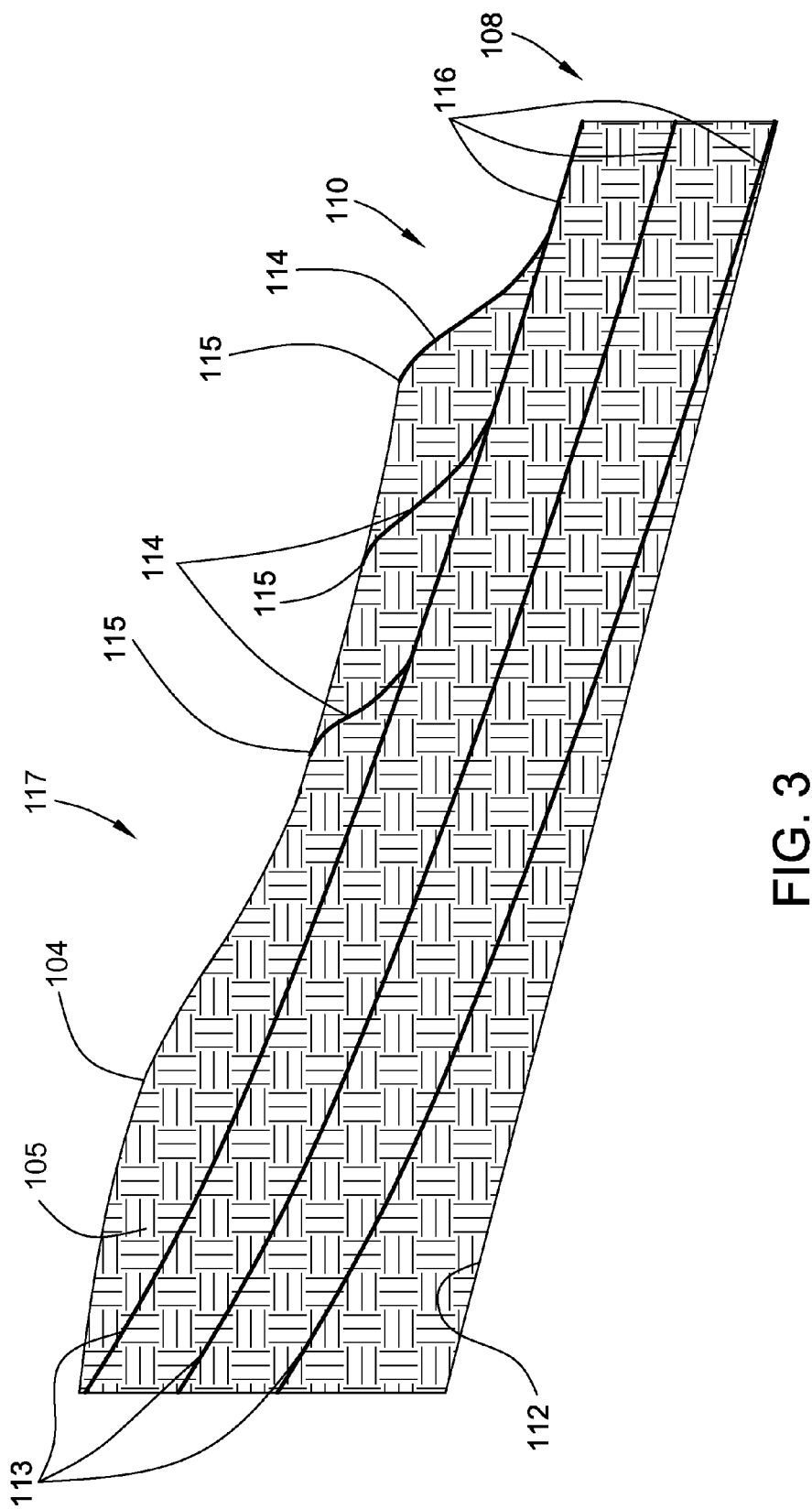
FIG. 3 depicts a cross-section of a portion of a work site depicting various aspects of a material moving plan.

As depicted in FIG. 3, in one embodiment, each slot 110 may be formed by removing material 105 from the work surface 104 in one or more layers or passes 113 until the final work surface or final design plane 112 is reached. The blade 16 of machine 10 may engage the work surface 104 with a series of cuts 114 that are spaced apart lengthwise along the slot 110. Each cut 114 begins at a cut location 115 along the work surface 104 at which the blade 16 engages the work surface and extends into the material 105 and moves towards the pass target or carry surface 116 for a particular pass. Controller 36 may be configured to guide the blade 16 along each cut 114 until reaching the carry surface 116 and then follow the carry surface towards the dump location 108.

Figure 4:
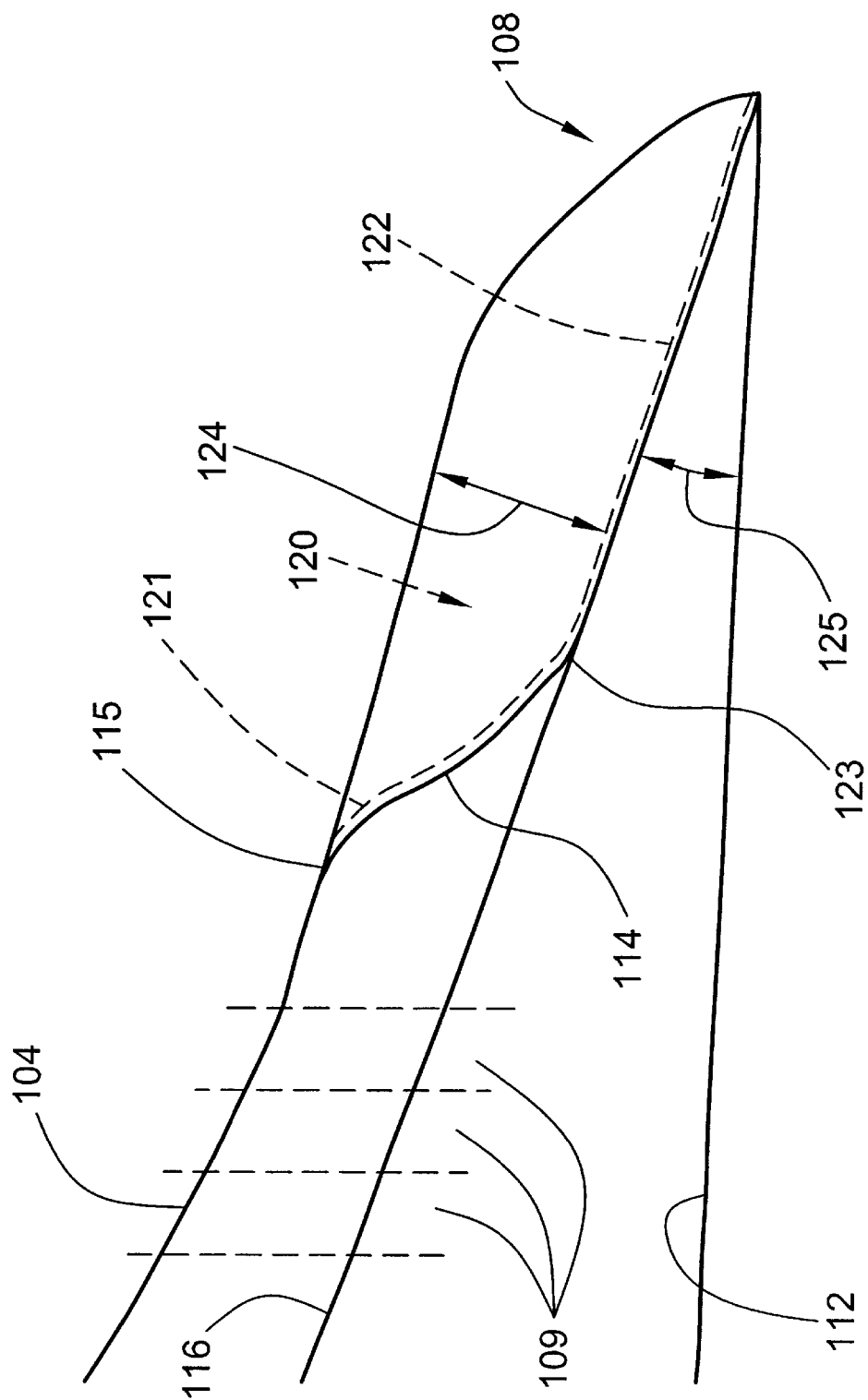
FIG. 4 depicts a diagrammatic cross-section of a portion of a work site depicting a potential target profile.

During each material moving pass, the controller 36 may guide the blade 16 generally along a desired path or target profile depicted by dashed line 120 in FIG. 4 from the cut location 115 to the dump location 108. A first portion of the target profile 120 extends from the cut location 115 to the carry surface 116. The first portion may be referred to as the loading profile 121 as that is the portion of the target profile 120 at which the blade 16 is initially loaded with material. A second portion of the target profile 120 extends from the intersection 123 of the cut 114 and the carry surface 116 to the dump location 108. The second portion may be referred to as the carry profile 122 as that is the portion of the target profile 120 at which the blade 16 carries the load along the carry surface 116.

The first portion or loading profile 121 may have any configuration and, depending on various factors including the configuration of the work surface 104 and the type of material to be moved, some cut profiles may be more efficient than others. The loading profile 121 may be formed of one or more segments that are equal or unequal in length and with each having different or identical shapes. These shapes may be linear, symmetrically or asymmetrically curved, Gaussian-shaped or any other desired shape. In addition, the angle of any of the shapes relative to the work surface 104 or the final design plane 112 may change from segment to segment.

The second portion or carry profile 122 may have any configuration but is often generally linear and sloped downward so that movement of material will be assisted by gravity to increase the efficiency of the material moving process. In other words, the carry profile 122 is often configured so that it slopes downward towards the dump location 108. The characteristics of the carry profile 122 (sometimes referred to as the slot parameters) may define the shape of the carry surface 116, the depth of the carry surface 116 below an uppermost surface of the work surface 104 as indicated by reference number 124, and the angle of the carry surface as indicated by reference number 125. In some instances, the angle 125 of the carry surface 116 may be defined relative to a gravity reference or relative to the final design plane 112.

Although it may be generally desirable for the blade 16 to follow the target profile 120, performance characteristics of the machine 10, characteristics of the material 105, and/or desired operating efficiencies may cause a deviation from the target profile 120. More specifically, as blade 16 makes a cut 114, the load on the blade will increase. Further, as the blade 16 travels along the carry surface 116, the load on the blade may continue to increase. If the blade 16 is overloaded for a particular slope, the machine 10 may slip and/or cause excess wear on the machine. Accordingly, the control system 35 may include a blade control system 40 to improve the efficiency of the material moving process.

In one embodiment, the blade control system 40 may control the load on the blade 16 so that the torque generated by the machine 10 is generally maintained at or about a predetermined value. In one example, it may be desirable to maintain the load on the machine 10 at approximately 80% of its maximum torque. In other examples, it may be desirable to maintain the load within a range of approximately 70-90% of the maximum torque. Other values and ranges are contemplated. In order to maintain the load at a desired value or within a desired range, the blade control system 40 may raise or lower the blade 16 to decrease or increase the amount of material carried by the blade 16 and thus decrease or increase the load.

The control system 35 may include an implement load monitoring system 41 shown generally by an arrow in FIG. 2. The implement load monitoring system 41 may include a variety of different types of implement load sensors depicted generally by an arrow in FIG. 2 as an implement load sensor system 42 to measure the load on the blade 16. In one embodiment, the implement load sensor system 42 may embody one or more pressure sensors 43 for use with one or more hydraulic cylinder, such as second hydraulic cylinders 22, associated with blade 16. Signals from the pressure sensor 43 indicative of the pressure within the second hydraulic cylinders 22 may be monitored by controller 36. Other manners of determining a change in cylinder pressure associated with a change in the load on blade 16 are contemplated, including other manners of measuring the pressure within second hydraulic cylinders 22 and measuring the pressure within other cylinders associated with the blade. The load on the blade 16 may be correlated to the load on the engine 13 by controller 36.

The load on the blade 16 may be affected by the slope of the terrain upon which the machine 10 is moving. Accordingly, if desired, the accuracy of the implement load measurement may be increased by utilizing the implement load sensor system 42 in conjunction with a slope or inclination sensor such as a pitch angle sensor. For example, if the machine 10 is moving uphill, the load on the blade 16 may be higher due to gravity as compared to a machine operating in the same conditions on flat terrain. Similarly, the load on the blade 16 may be lower for the same mass or volume when the machine in moving downhill. By determining the slope of the terrain, the controller 36 may more accurately determine changes in the load on the blade 16.

As used herein, the word "uphill" refers to a direction towards the high wall 102 relative to the crest 103 or dump location 108. Similarly, the word "downhill" refers to a direction towards the crest 103 or dump location 108 relative to the high wall 102.

If desired, control system 35 may also include a machine load monitoring system 44 that may be used by the blade control system 40. In one embodiment, the machine load monitoring system 44 may utilize an engine speed sensor (not shown) and a torque converter speed sensor (not shown) to measure a difference between the speed of the engine 13 and a torque converter (not shown) to determine the load on the machine 10.

Control system 35 may include a module or planning system 45 for determining or planning various aspects of the excavation plan. The planning system 45 may receive and store various types of input such as the configuration of the work surface 104, the final design plane 112, a desired loading profile 121, a desired carry profile 122, and characteristics of the material to be moved. Operating characteristics and capabilities of the machine 10 such as maximum load may also be entered into the planning system 45. The planning system 45 may simulate the results of cutting the work surface 104 at a particular cut location and for a particular target profile, and then choose a cut location that creates the most desirable results based on one or more criteria. In one embodiment, the planning function may be performed while operating the machine 10. In another embodiment, some or all aspects of the planning function may be performed ahead of time and the various inputs to the planning system 45 and the resultant cut locations, target profiles, and related data stored as part of the data maps of the controller 36.

Referring to FIGS. 3 and 4, a potential cut 114 at work site 100 that may be generated by control system 35 is illustrated. Work surface 104 represents the uppermost height of the existing material 105 at the slot 110. While the illustration is depicted in two dimensions, it should be appreciated that the data representing the illustration may be in three dimensions. In one example, the path 117 along slot 110 may be divided into a plurality of increments 109 (FIG. 4) and data stored within controller 36 for each increment. The controller 36 may store information or characteristics of the increment 109 such as the length of the work surface and its angular orientation relative to a ground reference, the material characteristics of material 105 beneath the work surface, a time stamp or indicator of the age of the data, and any other desired information. The information regarding each path 117 may be stored within an electronic map within controller 36 as part of a topographical map of the work site 100.

Information regarding each path 117 may be obtained according to any desired method. In one example, the machine 10 may utilize the position sensing system 27 described above to map out the contour of work surface 104 as machine 10 moves across it. This data may also be obtained according to other methods such as by a vehicle that includes lasers and/or cameras. It should be noted that as the machine 10 moves material 105 to the dump location 108, the position of the work surface 104 will change and may be updated based upon the current position of the machine 10 and the position of the blade 16.

As may be seen in FIG. 4, moving the blade 16 along the target profile 120 will result in a volume of material 105 being moved from slot 110. The planning system 45 may use the shape of the loading profile 121 and the cut location 115 to determine the volume of material that would be moved by blade 16 if the machine 10 were to follow the target profile 120. More specifically, the planning system 45 may use three-dimensional data that is used to represent the machine 10, the work surface 104, and the target profile 120 to make a volumetric calculation of the volume of material that will be moved for a particular target profile 120.

Planning system 45 may be configured to determine a cut location in any of a plurality of manners. In one configuration, the planning system 45 may analyze potential cut locations along path 117 using an admissible heuristic process or technique. In doing so, the planning system 45 may perform a coarse analysis along the path 117 of the machine 10 to determine a start location for a more precise or fine analysis that is used to determine an optimized cut location.

More specifically, the planning system 45 may first analyze the path 117 of the machine 10 by analyzing a plurality of relatively large or coarse analysis increments or steps while using a relatively large, coarse analysis cut length. The system may determine a selected coarse analysis increment based upon a coarse analysis parameter threshold stored within controller 36, a coarse analysis parameter for each of the plurality of coarse analysis increments, and the position of each of the plurality of coarse analysis increments along the path 117. Upon determining the selected coarse analysis increment, the planning system 45 may then analyze the selected coarse analysis increment for potential cut locations by utilizing a plurality of relatively small or fine analysis increments or steps and a relatively small, fine analysis cut length. An optimized cut location may be selected based upon a fine analysis parameter threshold stored within controller 36, a fine analysis parameter for each of the plurality of fine analysis increments, and the position of each of the plurality of fine analysis increments along the selected coarse analysis increment. Through such a process, the computing power and/or time required to determine an optimized cut location may be minimized.

The planning system 45 may analyze one or more parameters along the path 117 to determine an optimized cut location. In one embodiment, the parameter to be analyzed may be the amount of material to be moved at each potential cut location. The amount of material to be moved may be expressed in terms of volume, percentage of load on the blade 16, or in any other desired manner. In other embodiments, alternative or additional parameters may be used.

When utilizing volume of material as the parameter, the planning system 45 may be configured to seek a cut location 115 in which the volume of material to be cut or moved within a predetermined distance is a predetermined percentage of the maximum volume that may be moved by machine 10. In one embodiment, the loading percentage may be set at approximately 80%. In other embodiments, the loading percentage may be set at a lower volume such as approximately 70% and, in other embodiments, the loading percentage may be higher such as approximately 90%. It should be noted that during the analysis, the volume of material that may be moved may change based upon the slope of the path 117 along which the machine 10 is operating.

The analyzed parameter may be dependent on the target profile of each cut 114. For example, the coarse analysis parameter for each coarse analysis increment may be dependent on the target profile of each coarse analysis cut and the fine analysis parameter for each fine analysis increment may be dependent on a target profile of each fine analysis cut. When determining the amount of material to be moved, the planning system 45 may analyze the slope and curvature of the path 117 as well as the roughness or smoothness of the work surface 104. In addition, the characteristics of the material 105 to be moved such as its hardness, density, and cohesiveness may also be analyzed by the planning system 45. In some instances, the hardness, density, and cohesiveness may be set by an operator or other personnel based upon an estimate or actual testing. In other instances, the characteristics may be estimated. In any case, the planning system 45 may be configured to adjust estimates or calculations based upon conditions encountered by the machine 10 as it moves along the path.

Figure 6:
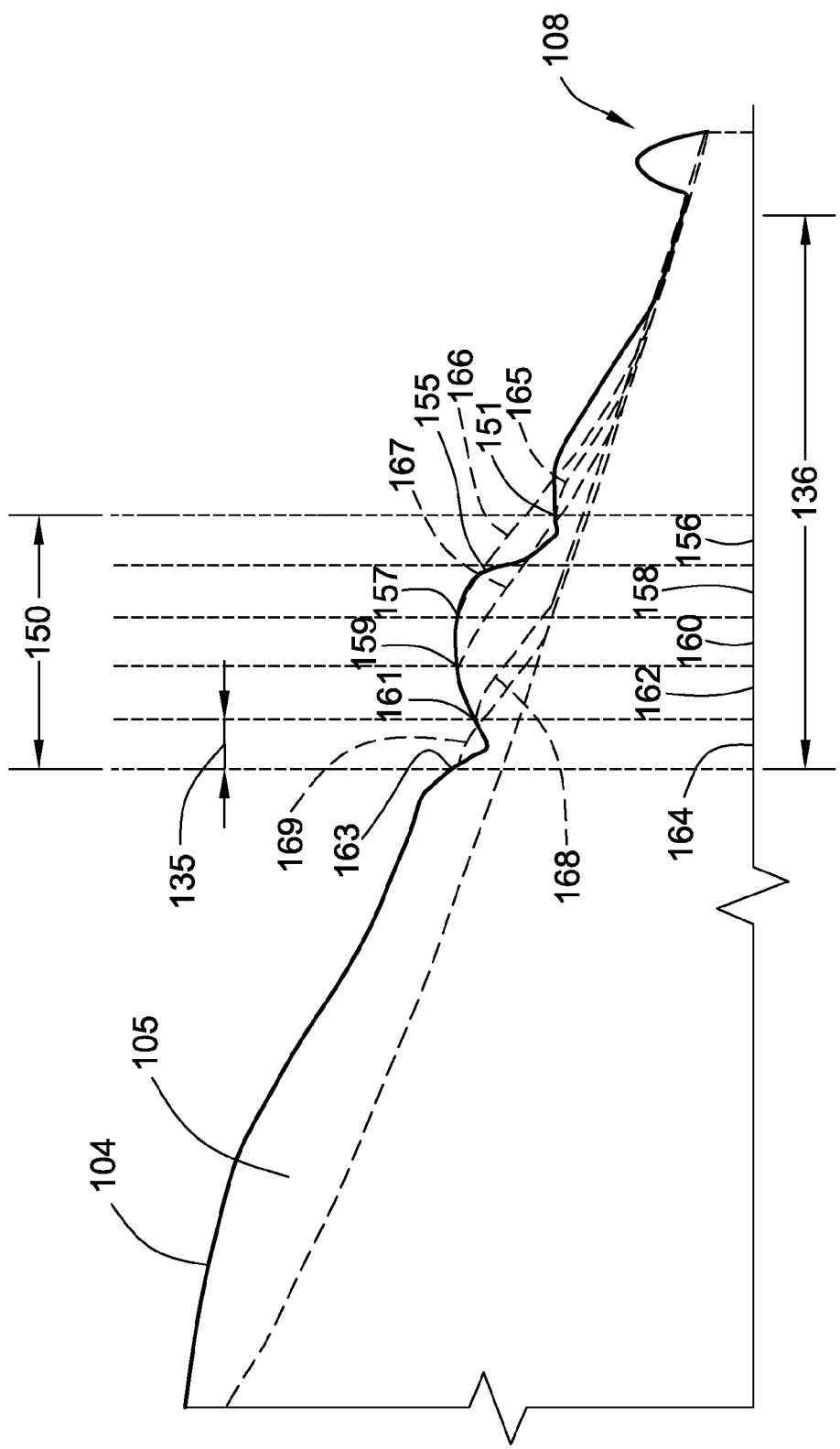
FIG. 6 depicts a cross-section similar to FIG. 5 but of another aspect of the cut optimization process in accordance with the disclosure.

Referring first to FIG. 6, the fine analysis increment 135 and the fine analysis cut length 136 may be set in any of a plurality of manners. The fine analysis increment 135 may be set at any desired length. In one embodiment, the length of the fine analysis increments 135 may be set to equal the length of the increments 109 (FIG. 4) used for mapping the work site 100 as described above. The fine analysis cut length 136 may also be set at any desired length.

Figure 5:
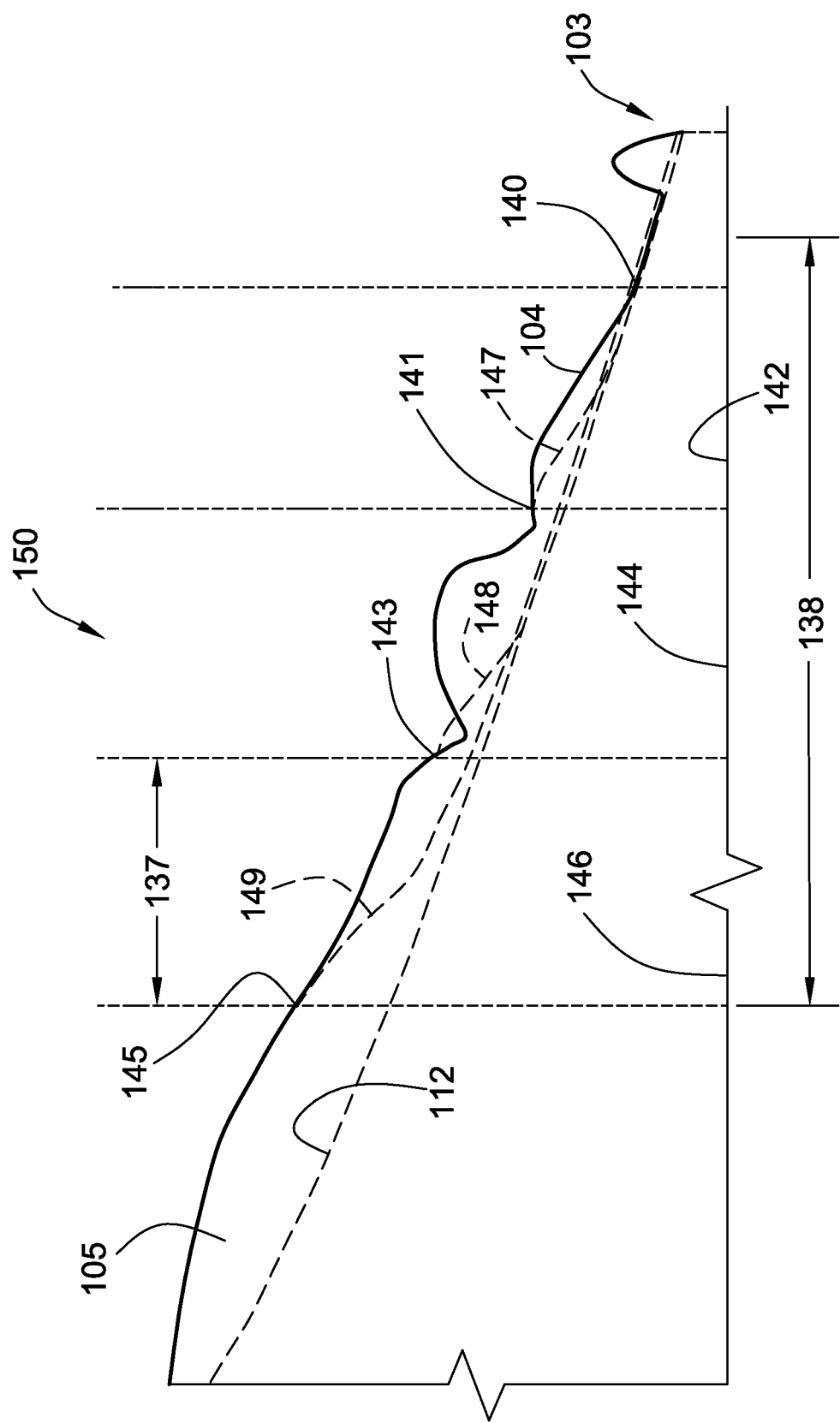
FIG. 5 depicts a cross-section of a portion of a work site depicting an aspect of the cut optimization process in accordance with the disclosure.

Referring to FIG. 5, the coarse analysis increment 137 and the coarse analysis cut length 138 may also be set in any of a plurality of manners. In general, it is desirable for the coarse analysis increment 137 and the coarse analysis cut length 138 to be sufficiently large to permit the planning system 45 to locate a fine analysis start location relatively quickly but not so large that the fine analysis may take a relatively long period of time. The coarse analysis increment 137 may be set as a multiple of the length of the fine analysis increments 135 or at any desired length. In one embodiment, the length of the coarse analysis increments 137 may be set to be equal to approximately ten fine analysis increments. In another embodiment, the length of the coarse analysis increments 137 may be set to be equal to between five and fifteen fine analysis increments. The coarse analysis cut length 138 may be set at any desired length. In one embodiment, the coarse analysis cut length 138 may be set to be equal to the length of one coarse analysis increment 137 plus the fine analysis cut length 136.

To begin the process of determining an optimized cut location, the end location 140 for the cutting process may be initially selected or determined. In some instances, the end location 140 may be a predetermined distance from the crest 103 since the planning system 45 may be configured to prevent cutting operations within a predetermined distance of the crest. The planning system 45 may use the end location 140 to determine a first coarse analysis start location 141 of the first coarse analysis increment 142 (i.e., the increment closest to the end location 140). To do so, the analysis may begin at the end location 140 and move uphill or towards the high wall 102 by the length of one coarse analysis increment 137 to define or set the first coarse analysis start location 141 of the first coarse analysis increment 142.

The planning system 45 may then determine the location of the second coarse analysis start location 143 for the next uphill or second coarse analysis increment 144 by starting at the beginning or uphill end of the first coarse analysis increment 142, which corresponds to the first coarse analysis start location 141, and moving uphill by the length of one coarse analysis increment 137.

The process of defining additional coarse analysis start locations and additional coarse analysis increments may be repeated to establish or determine a desired number of coarse increments. Referring to FIG. 5, a third coarse analysis increment 146 is depicted together with a third coarse analysis start location 145. As described in more detail below, in some instances, the coarse analysis increments may be determined sequentially so that a coarse analysis is performed on each coarse analysis increment 137 after its position is determined and the position of the next uphill coarse analysis increment is only determined if the current coarse analysis increment does not meet the desired coarse analysis parameter threshold. Other manners of determining the locations of the coarse analysis increments 137 are contemplated. For example, in some instances, the planning system 45 may establish the positions of the coarse analysis increments 137 by dividing the path 117, beginning at a start location such as high wall 102 and ending at the end location 140, into a plurality of the coarse analysis increments.

The planning system 45 may analyze each coarse analysis increment 137 for a coarse analysis parameter (such as the amount of material moved) to determine whether a cut beginning at the start location of a particular coarse analysis increment and extending for the coarse analysis cut length 138 will meet or exceed a desired coarse analysis parameter threshold. It should be noted that in instances when a coarse analysis start location is closer to the end location 140 than the length of the coarse analysis cut length 138, the planning system 45 may only determine the coarse analysis parameter through the end location. In other words, the planning system 45 may be configured to evaluate the parameter over the shorter of the coarse analysis cut length 138 and the distance from the coarse analysis start location to the end location 140.

Referring to FIG. 5 and using the volume of material as the parameter, the first coarse analysis increment 142 may be analyzed by determining the volume of material moved based upon a first coarse increment target profile 147 beginning at first coarse analysis start location 141. In doing so, the planning system 45 may determine the volume of material 105 above the proposed path of the tip 23 of blade 16 (i.e., the material between the first coarse increment target profile 147 and work surface 104) that would be moved towards the end location 140 by the proposed cut. Due to the proximity of the first coarse analysis start location 141 to end location 140, the planning system 45 will not be able to analyze movement of material 105 along the full length of a coarse analysis cut length 138 so the first coarse increment target profile 147 is somewhat truncated or shortened in FIG. 5.

The planning system 45 may analyze the volume of material moved from the first coarse analysis start location 141 to the end location 140 in terms of percentage of load on the machine 10 and compare the calculated percentage to a desired threshold percentage set as the coarse analysis parameter threshold. In one example, the threshold percentage may be set at 80% of the load on the machine 10.

As depicted in FIG. 5, the volume of material moved from the first coarse analysis start location 141 does not exceed the coarse analysis parameter threshold. Accordingly, the planning system 45 may analyze the second coarse analysis increment 144 by determining the volume of material moved from the second coarse analysis start location 143 to the end location 140 based upon second coarse increment target profile 148. As depicted, the volume of material moved from the second coarse analysis start location 143 based upon second coarse increment target profile 148 will exceed the coarse analysis parameter threshold. Accordingly, the planning system 45 may terminate the coarse analysis process for the current pass and the second coarse analysis increment 144 is designated as or defines a selected coarse analysis increment 150 that is further analyzed using the fine analysis process.

If the volume of material at the second coarse analysis increment 144 did not meet the coarse analysis parameter threshold, the analysis process would be repeated for additional coarse analysis increments until locating an increment that meets the coarse analysis parameter threshold. For example, the planning system 45 may have analyzed the third coarse analysis increment 146 by determining the volume of material moved from the third coarse analysis start location 145 to the end location 140 based upon third coarse increment target profile 149. Additional coarse analysis increments 137 and coarse increment target profiles may be set and analyzed in a consistent manner until locating a coarse analysis increment that meets the coarse analysis parameter threshold.

Upon completion of the coarse analysis process with the identification of a selected coarse analysis increment 150, the planning system 45 may begin the fine analysis process. The planning system 45 may determine fine analysis start locations in a manner similar to that described above with respect to the coarse analysis start locations. More specifically and as depicted in FIG. 6, the planning system 45 may use the downhill end 151 of the selected coarse analysis increment 150 to determine a first fine analysis start location 155 of the first fine analysis increment 156. To do so, the analysis may begin at the downhill end 151 and move uphill or towards the high wall 102 by the length of one fine analysis increment 135 to define or set the first fine analysis start location 155 of the first fine analysis increment 156.

The planning system 45 may then determine the location of the second fine analysis start location 157 for the next uphill or second fine analysis increment 158 by starting at the beginning or uphill end of the first fine analysis increment 156, which corresponds to the first fine analysis start location 155 and the downhill end of the second fine analysis increment 158, and moving uphill by the length of one fine analysis increment 135.

As with the process of defining coarse analysis start locations and coarse analysis increments, the process of defining fine analysis start locations and fine analysis increments may be repeated to establish or determine a desired number of fine analysis increments. As depicted in FIG. 6, five fine analysis increments are depicted and the additional fine analysis increments are identified with reference numbers 160, 162, and 164. Again, as described above with respect to the coarse analysis process, in some instances, the fine analysis increments 135 may be determined sequentially so that a fine analysis is performed on a fine analysis increment after its position is determined and the position of the next uphill fine analysis increment is only determined if the current fine analysis increment does not meet the desired fine analysis parameter threshold.

The planning system 45 may analyze each fine analysis increment 135 with respect to a fine analysis parameter to determine whether a cut beginning at the start location of the fine analysis increment and extending for the fine analysis cut length 136 will meet or exceed the desired fine analysis parameter threshold. In some instances, the fine analysis parameter may be same as the coarse analysis parameter (i.e., the amount of material moved) or the parameters may be different. Even if the parameters are the same, the value of the fine analysis parameter threshold may differ from the value of the coarse analysis parameter threshold, if desired. For example, if the parameter thresholds are expressed in terms of a percentage of the load on the machine, the loads may be different for the coarse analysis parameter threshold versus the fine analysis parameter threshold.

Referring to FIG. 6 and using the volume of material at the parameter, the first fine analysis increment 156 may be analyzed by determining the volume of material moved based upon a first fine increment target profile 165 beginning at first fine analysis start location 155. In doing so, the planning system 45 may determine the volume of material 105 above the proposed path of the tip 23 of blade 16 (i.e., the material between the first fine increment target profile 165 and the work surface 104) that would be moved towards the end location 140 by implementing a cut according to the first fine increment target profile. As with the coarse analysis, if a fine increment target profile extends past the end location 140, the fine increment target profile may be truncated or shortened for that increment.

The planning system 45 may analyze the volume of material moved from the first fine analysis start location 155 to the end location 140 in terms of a percentage of load on the machine 10 and compare the calculated percentage to a desired threshold percentage set as the fine analysis parameter threshold. As depicted in FIG. 6, the volume of material moved from the first fine analysis start location 155 does not exceed the fine analysis parameter threshold. Accordingly, the planning system 45 may analyze the next or second fine analysis increment 158 by determining the volume of material moved from the second fine analysis start location 157 to the end location 140 based upon the second fine increment target profile 166. As depicted, the volume of material moved based upon the second fine increment target profile 166 is less than the fine analysis parameter threshold.

Since the volume of material for second fine analysis increment 158 did not meet the fine analysis parameter threshold, the planning system 45 may continue the fine analysis by determining the volume of material moved starting at the third fine analysis start location 159 of the third fine analysis increment 160 based upon third fine increment target profile 167. As depicted, the volume of material moved based on the third fine increment target profile 167 will exceed the fine analysis parameter threshold and the planning system 45 may terminate the fine analysis process for the current pass. The third fine analysis start location 159 may be designated or set by the planning system 45 as the optimized cut location and the controller 36 may provide instructions or commands for the machine 10 to begin a new cut at the optimized cut location. If the volume of material associated with the third fine analysis increment 160 had not exceeded the fine analysis parameter threshold, the planning system 45 would have continued the fine analysis process until a fine analysis increment 135 met the fine analysis parameter threshold (such as by analyzing fourth fine increment target profile 168 and fifth fine increment target profile 169).

Although described in terms of determining the position of each of a plurality of coarse analysis increments 137 along path 117 and determining a coarse analysis parameter for each of the plurality of coarse analysis increments, and then determining the position of each of a plurality of fine analysis increments 135 along the selected coarse analysis increment 150 and determining a fine analysis parameter for each of the plurality of fine analysis increments, in some instances, it may be desirable to perform each of the coarse and fine analyses sequentially.

For example, the path 117 may include a start location such as high wall 102 and an end location 140 with the plurality of coarse analysis increments 137 positioned therebetween. The planning system 45 may operate to sequentially analyze the plurality of coarse analysis increments 137, beginning at the coarse analysis increment closest to the end location 140, to determine the coarse analysis parameter for the specific coarse analysis increment until the coarse analysis parameter for one of the plurality of coarse analysis increments exceeds the coarse analysis parameter threshold. At such time the coarse analysis increments being analyzed defines the selected coarse analysis increment 150.

Further, the selected coarse analysis increment 150 may include a fine analysis start location and a fine analysis end location. The fine analysis start location may be the uphill end of the selected coarse analysis increment 150 and the fine analysis end location may be the downhill end. The plurality of fine analysis increments are positioned between the fine analysis start location and the fine analysis end location. The planning system 45 may be configured to sequentially analyze the plurality of fine analysis increments beginning at the fine analysis increment closest to the fine analysis end location to determine the fine analysis parameter for the specific fine analysis increment until the fine analysis parameter for one of the plurality of fine analysis increments exceeds the fine analysis parameter threshold. The one of the plurality of fine analysis increments then defines the optimized cut location.

In some instances, it may be desirable for the planning system 45 to perform the coarse and fine analysis processes while the machine is moving uphill from the dump location 108 after completing a cutting pass. In doing so, the planning system 45 may operate to select the optimized cut location while the machine 10 is moving uphill along the path 117. It may be desirable for the controller 36 to move the machine 10 uphill only until it reaches the optimized cut location and then send appropriate commands to begin a new cutting pass or operation. Moving the machine 10 farther uphill than the optimized cut location may be inefficient as it will result in wasted fuel and time as the machine is subsequently moved downhill in an unloaded condition to the optimized cut location. Further, maintaining the machine 10 at the dump location 108 during the analysis process may also be inefficient as it may increase the cycle time for the cutting passes and increase fuel usage while idling. By controlling the speed of the machine 10 during the analysis process, fuel usage and time may also be optimized.

In order to further reduce the time required for signals to be transmitted from a remote location to the machine 10, it may be desirable for a portion of the controller 36 on-board the machine to be able to perform some, if not all, of the cut location analysis. For example, it may be desirable for an on-board portion of the controller 36 to determine the position of the plurality of coarse analysis increments 137, determine the coarse analysis parameter for each of the plurality of coarse analysis increments, determine the selected coarse analysis increment 150, determine the position of the plurality of fine analysis increments 135, determine the fine analysis parameter for each of the plurality of fine analysis increments, and select the optimized cut location. By providing at least a portion of the cut location analysis on-board machine 10, delays in signal transmission from a portion of the controller 36 remote from machine 10 may be reduced or eliminated.

Figure 7:
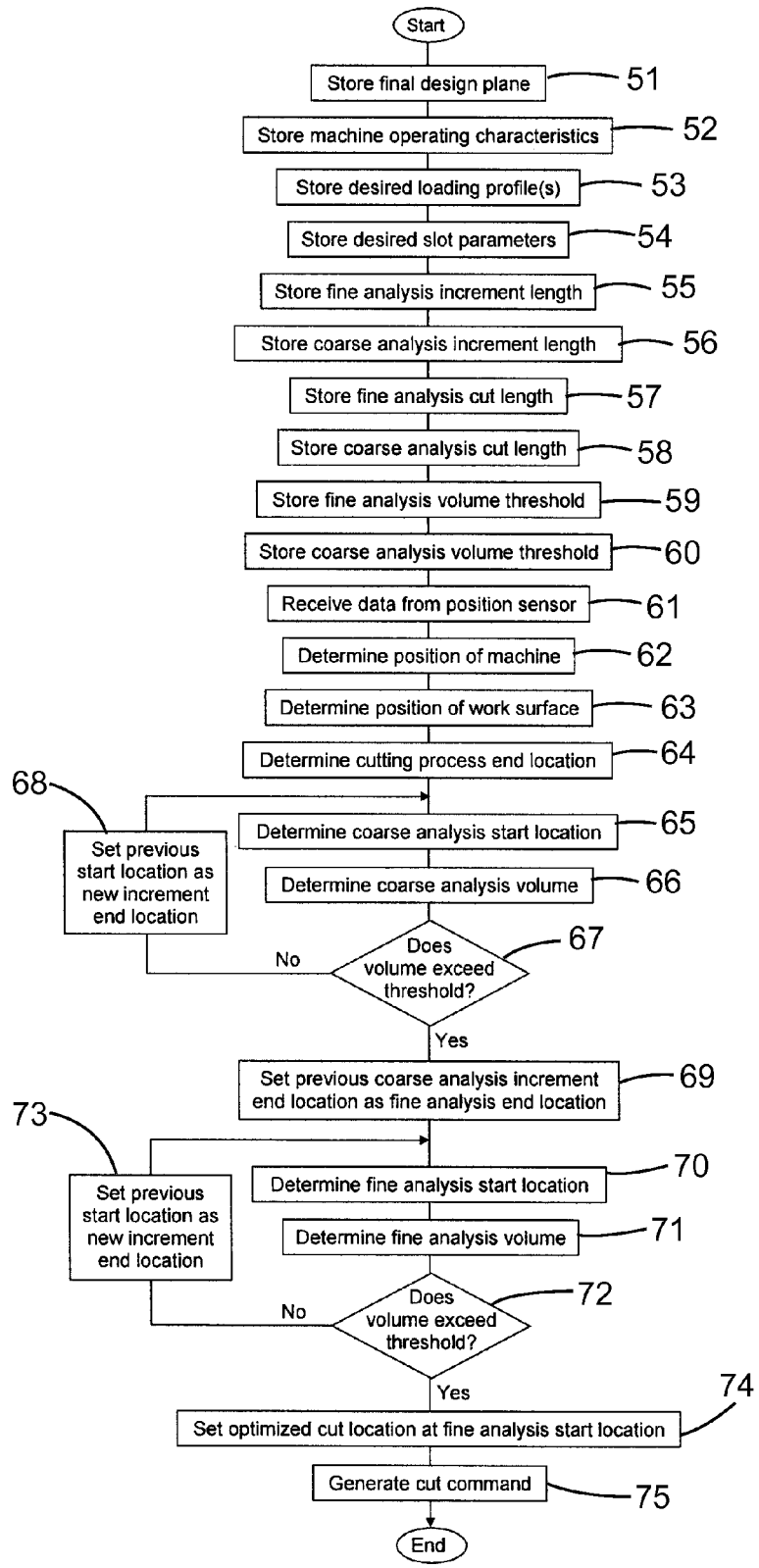
FIG. 7 depicts a flowchart illustrating the cut optimization process in accordance with the disclosure.

The flowchart in FIG. 7 depicts a process in which the planning system 45 may determine an optimal location for a cut 114. At stage 51, the final design plane 112 may be set or stored within or entered into the controller 36. In one embodiment, the final design plane 112 may be entered by an operator or other personnel. In another embodiment, the final design plane 112 may be generated by the controller 36.

At stage 52, the operating characteristics of the machine 10 may be entered into controller 36. The operating characteristics may include a desired maximum load on the machine 10 and the dimensions of the machine including those of blade 16. The dimensions of blade 16 may be used by controller 36 to determine the volume of material that may be moved by the machine 10.

The desired loading profile 121 of the target profile 120 may be entered into the controller 36 at stage 53. As stated above, the loading profile 121 may have any desired configuration. At stage 54, the carry profile 122 or slot parameters may be entered into the controller 36. The slot parameters may define the shape of the carry surface 116, the depth of carry surface below the work surface 104 and each subsequent carry surface, the angle 125 of the carry surface 116 relative to a fixed reference, and the curvature of the carry surface.

The length of each fine analysis increment 135 may be set or stored within controller 36 at stage 55. In some instances, the length of the fine analysis increment 135 may be equal to the length of the increments 109 used for mapping the work site 100. The length of each coarse analysis increment 137 may be set or stored at stage 56. As stated above, the coarse analysis increment 137 may be equal to a predetermined number of fine analysis increments 135 or any other length.

The fine analysis cut length 136 may be set or stored at stage 57. The fine analysis cut length 136 may be set to equal the length of the target profile 120 or any other desired length. The coarse analysis cut length 138 may be set or stored at stage 58. The coarse analysis cut length 138 may be set to any desired length. In one embodiment, the coarse analysis cut length 138 may be set to equal the length of one coarse analysis increment 137 plus the fine analysis cut length 136.

At stage 59, the fine analysis parameter threshold may be set or stored within controller 36. At stage 60, the coarse analysis parameter threshold may be set or stored within controller 36. In the flowchart of FIG. 7, the parameter is the volume of material so that the fine analysis parameter threshold is a fine analysis volume threshold and the coarse analysis parameter threshold is a coarse analysis volume threshold. Other parameters may be used as desired.

The controller 36 may receive at stage 61 data from the position sensor 28. At stage 62, the controller 36 may determine the position of the machine 10 based upon the data from the position sensor 28.

The position or configuration of the work surface 104 may be determined at stage 63. The configuration of the work surface 104 may be determined in any desired manner including moving machines autonomously about the work site 100. In an alternate process, an operator may manually operate machines 10, either from within the cab 24 of the machine or by remote control, and the topography of the work site 100 recorded. In another alternate embodiment, an electronic map of the work site may be generated by moving a mapping vehicle (not shown) about the work site. As the machine 10 moves along the path 117, the position of the machine may be used to determine the position of the work surface and update the electronic map of the work site 100 within controller 36.

At stage 64, a location at which the end location 140 of the coarse analysis may be set or determined. In one embodiment, the end location 140 may be set manually. In another embodiment, the end location 140 may be set or determined as the end location of any cutting process which may be based upon a position of the crest 103 (e.g., may be a predetermined distance from the crest).

The coarse analysis start location may be determined at stage 65 by controller 36. In one embodiment, a first coarse analysis start location 141 may be determined by starting at the end location 140 and moving uphill (e.g., towards high wall 102) a distance equal to one coarse analysis increment 137. The planning system 45 may determine at stage 66 the volume of material moved by a cut beginning at the first coarse analysis start location 141 and moving along the first coarse increment target profile 147.

At decision stage 67, the controller 36 may determine whether the calculated coarse analysis volume exceeds the coarse analysis volume threshold. If the coarse analysis volume for the first coarse analysis increment 142 does not exceed the coarse analysis volume threshold, the controller 36 may continue the coarse analysis at stage 68 by moving uphill one coarse analysis increment 137. More specifically, the controller 36 may begin by setting the first coarse analysis start location 141 as the end location of the second coarse analysis increment. The process of stages 65-67 may then be repeated to analyze the second coarse analysis increment 144 and each subsequent coarse analysis increment until the volume of one of the coarse analysis increments exceeds the coarse analysis volume threshold at decision stage 67.

Once the coarse increment analysis volume exceeds the coarse analysis volume threshold at decision stage 67, the controller 36 may terminate the coarse analysis process and begin the fine analysis process to determine the optimized cut location. In doing so, the coarse analysis increment that exceeds the coarse analysis volume threshold is set as or defines the selected coarse analysis increment 150.

At stage 69, the downhill end 151 of the selected coarse analysis increment 150 may be set as the fine analysis end location. In other words, the end of the selected coarse analysis increment 150 closest to crest 103 may be set as the new end location for the fine analysis process.

The controller may determine at stage 70 the first fine analysis start location 155 by beginning with the fine analysis end location and moving uphill by a distance equal to the length of one fine analysis increment 135. Beginning at the first fine analysis start location 155, the planning system 45 may determine at stage 71 the volume of material moved by a cut along the first fine increment target profile 165.

At decision stage 72, the controller 36 may determine whether the calculated fine analysis volume exceeds the fine analysis volume threshold. If the fine analysis volume for the first fine analysis increment 156 does not exceed the fine analysis volume threshold, the controller 36 may continue the fine analysis at stage 73 by moving uphill one fine analysis increment 135. The controller 36 may do so by setting the first fine analysis start location 155 as the end location of the second fine analysis increment 158. The process of stages 70-72 may then be repeated to analyze the second fine analysis increment 158 and each subsequent fine analysis increment until the volume of one of the fine analysis increments exceeds the fine analysis volume threshold at decision stage 72.

Once the fine increment analysis volume exceeds the fine analysis volume threshold at decision stage 72, the controller 36 may terminate the fine analysis process and set the start location for the fine analysis increment that exceeded the fine analysis volume threshold as the location for the optimized cut location. The controller 36 may generate appropriate commands at stage 75 to direct the machine 10 to cut the work surface 104 at the optimized cut location.

INDUSTRIAL APPLICABILITY

The industrial applicability of the control system 35 described herein will be readily appreciated from the forgoing discussion. The foregoing discussion is applicable to systems in which a plurality of machines 10 are operated autonomously, semi-autonomously, or manually at a work site 100. Such system may be used at a mining site, a landfill, a quarry, a construction site, a roadwork site, a forest, a farm, or any other area in which movement of material is desired.

Machine 10 may be operative with a planning system 45 of control system 35 and operate to determine an optimized location for a cut 114 in a relatively quick and efficient manner. The planning system may operate to initially analyze a plurality of coarse analysis increments 137 while using a coarse analysis cut length 138. Once the planning system 45 has selected one of the coarse analysis increments, the planning system may then utilize a plurality of fine analysis increments 135 and a fine analysis cut length 136 to analyze the selected coarse analysis increment 150.

By first performing the coarse analysis and then performing the fine analysis, the planning system 45 may reduce the computing power and/or time required to determine the first cut location uphill battle towards high wall 102 from the crest 103. As such, the planning system 45 may efficiently locate the cut location closest to the crest 103 that meets the desired characteristics.

In some instances, it may be desirable for the planning system 45 to analyze potential cut locations while the machine 10 is moving uphill after completing a cutting pass. By synchronizing the determination of the optimized cut location with the movement of the machine 10 uphill towards the high wall 102, it may be possible to improve the efficiency of the operation of the machine. For example, fuel and time will not be wasted while idling during the analysis process and the machine will not move farther uphill than is necessary.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for determining an optimized cut location for a work implement of a machine, the machine moving on a work surface along a path, comprising:
   a position sensor associated with the machine for generating position signals indicative of a position of the work surface;
   a controller configured to:
      store a coarse analysis cut length;
      store a coarse analysis parameter threshold;
      store a fine analysis cut length;
      store a fine analysis parameter threshold;
      determine the position of the work surface based upon the position signals;
      determine a position of each of a plurality of coarse analysis increments along the path;
      determine a coarse analysis parameter for each of the plurality of coarse analysis increments based upon the position of the work surface and the coarse analysis cut length;
      select one of the plurality of coarse analysis increments based upon the coarse analysis parameter threshold, the coarse analysis parameter for each of the plurality of coarse analysis increments, and the position of each of the plurality of coarse analysis increments relative to the path to define a selected coarse analysis increment;
      determine a position of each of a plurality of fine analysis increments along the selected coarse analysis increment;
      determine a fine analysis parameter for each of the plurality of fine analysis increments based upon the position of the work surface and the fine analysis cut length; and
   select the optimized cut location from one of the plurality of fine analysis increments based upon the fine analysis parameter threshold, the fine analysis parameter for each of the plurality of fine analysis increments, and the position of each of the plurality of fine analysis increments relative to the selected coarse analysis increment.

2. The system of claim 1, wherein the path includes a start location and an end location and the plurality of coarse analysis increments are positioned between the start location and the end location and the controller is further configured to sequentially analyze the plurality of coarse analysis increments beginning at a coarse analysis increment closest to the end location to determine the coarse analysis parameter until the coarse analysis parameter for one of the plurality of coarse analysis increments exceeds the coarse analysis parameter threshold, the one of the plurality of coarse analysis increments defining the selected coarse analysis increment.

3. The system of claim 2, wherein the selected coarse analysis increment includes a fine analysis start location and a fine analysis end location and the plurality of fine analysis increments are positioned between the fine analysis start location and the fine analysis end location, and the controller is further configured to sequentially analyze the plurality of fine analysis increments beginning at a fine analysis increment closest to the fine analysis end location to determine the fine analysis parameter until the fine analysis parameter for one of the plurality of fine analysis increments exceeds the fine analysis parameter threshold, the one of the plurality of fine analysis increments defining the optimized cut location.

4. The system of claim 1, wherein the selected coarse analysis increment includes a fine analysis start location and a fine analysis end location and the plurality of fine analysis increments are positioned between the fine analysis start location and the fine analysis end location, and the controller is further configured to sequentially analyze the plurality of fine analysis increments beginning at a fine analysis increment closest to the fine analysis end location to determine the fine analysis parameter until the fine analysis parameter for one of the plurality of fine analysis increments exceeds the fine analysis parameter threshold, the one of the plurality of fine analysis increments defining the optimized cut location.

5. The system of claim 1, wherein the coarse analysis cut length is generally equal to a coarse analysis increment plus the fine analysis cut length.

6. The system of claim 1, wherein a coarse analysis increment is equal to between 5 and 15 fine analysis increments.

7. The system of claim 1, wherein a coarse analysis increment is equal to approximately 10 fine analysis increments.

8. The system of claim 1, wherein the coarse analysis parameter for each of the plurality of coarse analysis increments is dependent on a target profile of each coarse analysis increment and the fine analysis parameter for each of the plurality of fine analysis increments is dependent on a target profile of each fine analysis increment.

9. The system of claim 8, wherein a loading profile along each coarse analysis increment and a loading profile of along each fine analysis increment are generally Gaussian-shaped.

10. The system of claim 1, wherein the fine analysis parameter for each of the plurality of fine analysis increments is further based upon one of a curvature of the work surface, a slope of the work surface, a roughness of the work surface, and material characteristics of material to be moved by the work implement.

11. The system of claim 1, wherein a portion of the controller on-board the machine is further configured to determine the position of the plurality of coarse analysis increments, determine the coarse analysis parameter for each of the plurality of coarse analysis increments, select one of the coarse analysis increments, determine the position of the plurality of fine analysis increments, determine the fine analysis parameter for each of the plurality of fine analysis increments, and select the optimized cut location.

12. The system of claim 1, further including a ground-engaging drive mechanism for moving the machine along the path and wherein the controller is configured to determine the coarse analysis parameter for each of the plurality of coarse analysis increments while the machine is moving along the path.

13. The system of claim 12, wherein the controller is configured to determine the fine analysis parameter for each of the plurality of fine analysis increments while the machine is moving along the path.

14. A controller implemented method of determining an optimized cut location for a work implement of a machine, the machine moving on a work surface along a path, comprising:
storing a coarse analysis cut length;
storing a coarse analysis parameter threshold;
storing a fine analysis cut length;
storing a fine analysis parameter threshold;
determining a position of the work surface based upon position signals from a position sensor;
determining a position of each of a plurality of coarse analysis increments along the path;
determining a coarse analysis parameter for each of the plurality of coarse analysis increments based upon the position of the work surface and the coarse analysis cut length;
selecting one of the plurality of coarse analysis increments based upon the coarse analysis parameter threshold, the coarse analysis parameter for each of the plurality of coarse analysis increments, and the position of each of the plurality of coarse analysis increments relative to the path to define a selected coarse analysis increment;
determining a position of each of a plurality of fine analysis increments along the selected coarse analysis increment;
determining a fine analysis parameter for each of the plurality of fine analysis increments based upon the position of the work surface and the fine analysis cut length; and
selecting the optimized cut location from one of the plurality of fine analysis increments based upon the fine analysis parameter threshold, the fine analysis parameter for each of the plurality of fine analysis increments, and the position of each of the plurality of fine analysis increments relative to the selected coarse analysis increment.

15. The method of claim 14, wherein the path includes a start location and an end location and the plurality of coarse analysis increments are positioned between the start location and the end location and further including sequentially analyzing the plurality of coarse analysis increments beginning at a coarse analysis increment closest to the end location to determine the coarse analysis parameter until the coarse analysis parameter for one of the plurality of coarse analysis increments exceeds the coarse analysis parameter threshold, the one of the plurality of coarse analysis increments defining the selected coarse analysis increment.

16. The method of claim 15, wherein the selected coarse analysis increment includes a fine analysis start location and a fine analysis end location and the plurality of fine analysis increments are positioned between the fine analysis start location and the fine analysis end location, and further including sequentially analyzing the plurality of fine analysis increments beginning at a fine analysis increment closest to the fine analysis end location to determine the fine analysis parameter until the fine analysis parameter for one of the plurality of fine analysis increments exceeds the fine analysis parameter threshold, the one of the plurality of fine analysis increments defining the optimized cut location.

17. The method of claim 14, wherein the steps of determining the position of each of the plurality of coarse analysis increments, determining the coarse analysis parameter for each of the plurality of coarse analysis increments, selecting one of the plurality of coarse analysis increments, determining the position of the plurality of fine analysis increments, determining the fine analysis parameter for each of the plurality of fine analysis increments, and selecting the optimized cut location all occur on-board the machine.

18. The method of claim 14, further including moving the machine along the path and determining the coarse analysis parameter for each of the plurality of coarse analysis increments while the machine is moving along the path.

19. The method of claim 18, further including determining the fine analysis parameter for each of the plurality of fine analysis increments while the machine is moving along the path.

20. A machine, comprising:
   a prime mover;
   a work implement for engaging a work surface along a path;
   a position sensor for generating position signals indicative of a position of the work surface;
   a controller configured to:
      store a coarse analysis cut length;
      store a coarse analysis parameter threshold;
      store a fine analysis cut length;
      store a fine analysis parameter threshold;
      determine the position of the work surface based upon the position signals;
      determine a position of each of a plurality of coarse analysis increments along the path;
      determine a coarse analysis parameter for each of the plurality of coarse analysis increments based upon the position of the work surface and the coarse analysis cut length;
      select one of the plurality of coarse analysis increments based upon the coarse analysis parameter threshold, the coarse analysis parameter for each of the plurality of coarse analysis increments, and the position of each of the plurality of coarse analysis increments relative to the path to define a selected coarse analysis increment;
      determine a position of each of a plurality of fine analysis increments along the selected coarse analysis increment;
      determine a fine analysis parameter for each of the plurality of fine analysis increments based upon the position of the work surface and the fine analysis cut length; and
      select an optimized cut location from one of the plurality of fine analysis increments based upon the fine analysis parameter threshold, the fine analysis parameter for each of the plurality of fine analysis increments, and the position of each of the plurality of fine analysis increments relative to the selected coarse analysis increment.

\* \* \* \* \*